United States Patent [19]

Stone

[11] Patent Number: 4,858,787
[45] Date of Patent: Aug. 22, 1989

[54] TOP ASSEMBLY FOR COFFEE POTS INCORPORATING ECCENTRIC LIQUID TRAP AND RETAINER THEREFOR

[75] Inventor: Wayne B. Stone, Birch Tree, Mo.

[73] Assignee: Wood Manufacturing Co., Inc., North Flippin, Ark.

[21] Appl. No.: 184,815

[22] Filed: Apr. 22, 1988

Related U.S. Application Data

[63] Continuation-in-part of Ser. No. 896,712, Aug. 15, 1986, which is a continuation-in-part of Ser. No. 532,980, Sep. 16, 1983, abandoned, and a continuation of Ser. No. 921,881, Oct. 22, 1986.

[51] Int. Cl.⁴ .............................................. A47G 19/14
[52] U.S. Cl. .................. 222/188; 222/465.1; 222/542; 222/569; 220/374
[58] Field of Search ..................... 222/465.1, 188, 478, 222/479, 542, 567, 569, 481.5, 570; 220/205, 361, 370, 368, 373, 374, 228

[56] References Cited

U.S. PATENT DOCUMENTS

| | | | |
|---|---|---|---|
| 41,447 | 2/1864 | Rawson | 222/188 |
| 251,151 | 12/1881 | Winfield et al. | 222/188 |
| D. 268,387 | 5/1983 | Stone, Jr. | D7/321 |
| 640,495 | 1/1900 | Spangler | 222/188 |
| 642,787 | 2/1900 | Eakin | 222/188 |
| 644,831 | 3/1900 | Shade | 222/188 |
| 831,419 | 9/1906 | Day | 222/188 |
| 959,012 | 5/1910 | Hintermann | 222/188 |
| 1,436,708 | 11/1922 | Goebel | 222/478 |
| 1,534,670 | 4/1925 | Smith | 222/188 |
| 1,601,723 | 10/1926 | Elbert | 222/455 |
| 1,635,502 | 5/1875 | McFarland | 222/188 |
| 2,190,092 | 2/1940 | Bailey | 222/456 |
| 2,425,142 | 8/1947 | Brubaker | 222/456 |
| 2,993,629 | 7/1961 | Ruhnke | 222/570 |
| 3,114,484 | 12/1963 | Serio | 222/475.1 |
| 3,171,571 | 3/1965 | Daniels | 222/94 |
| 3,974,758 | 8/1976 | Stone, Jr. | 99/275 |
| 4,116,357 | 9/1978 | Stanley, Jr. | 220/205 |
| 4,171,075 | 10/1979 | Gangwisch | 222/456 |
| 4,361,257 | 11/1982 | Stone, Jr. | 222/464 |
| 4,390,108 | 6/1983 | Knoll | 220/228 |
| 4,419,927 | 12/1983 | Stone, Jr. | 99/275 |
| 4,473,003 | 9/1984 | Stone, Jr. | 99/305 |
| 4,526,797 | 7/1985 | Stone, Jr. | 426/520 |
| 4,550,027 | 10/1985 | Stone, Jr. | 426/433 |
| 4,622,230 | 11/1986 | Stone, Jr. | 426/433 |
| 4,638,929 | 1/1987 | Stone, Jr. | 222/456 |

FOREIGN PATENT DOCUMENTS

| 38784 | 8/1907 | Fed. Rep. of Germany | 222/564 |
|---|---|---|---|
| 478147 | 2/1953 | Italy | 222/456 |

*Primary Examiner*—Andres Kashnikow
*Assistant Examiner*—Karen B. Merritt
*Attorney, Agent, or Firm*—Banner, Birch, McKie & Beckett

[57] ABSTRACT

An eccentrically positioned liquid trap improves coffee pour rate through a coffee pot top assembly that is retained in substantial sealing engagement with the open mount of a coffee pot by a retainer ring whose retention of the same is insensitive to variations in production tolerances.

5 Claims, 2 Drawing Sheets

TOP ASSEMBLY FOR COFFEE POTS INCORPORATING ECCENTRIC LIQUID TRAP AND RETAINER THEREFOR

CROSS REFERENCE TO RELATED APPLICATIONS

This is a continuation-in-part of application Ser. No. 896,712 filed Aug. 15, 1986 which is a continuation-in-part of application Ser. No. 532,980 filed Sept. 16, 1983 which latter application was allowed to go abandoned subsequent to the filing of a continuation application Ser. No. 921,881 filed Oct. 22, 1986.

BACKGROUND OF THE INVENTION

The concept of extending the "pot life" of pot contained coffee by introducing freshly brewed coffee into a substantially sealed coffee pot by way of a liquid trap and subsequently decanting coffee from the coffee pot through the same liquid trap whereby oxidation and evaporation of the pot contained coffee is substantially eliminated was introduced by applicant's parent application Ser. No. 532,980 which became abandoned subsequent to the filing of a copending, continuation application Ser. No. 921,881.

The present application is directed to improvements in that type top assembly, or "insert", illustrated in FIGS. 1–4 of parent application Ser. No. 896,712 used with conventional food service bowls of the type manufactured by Bloomfield Industries, Inc., 4546 W. 47th Street, Chicago, IL 60632.

Prior "inserts", or top assemblies, of the type with which the present invention is concerned have interfitted with the open top of a coffee pot via a deformable gasket, as in copending patent application Ser. No. 921,881, or integrally molded, deformable legs as in parent application Ser. No. 896,712. Extended usage of each of the foregoing methods of "sealing" an insert with respect to its associated coffee pot reveals that both are adversely affected by factors, inherent to their environment and usage, that cannot be controlled in production within realistic, commercial cost parameters. These factors are:

1) The inherent, production diameter variations in both the coffee pot opening and the insert; and 2) The relatively high temperature to which both the insert and its sealing means are exposed in usage.

In the case of the gasket sealed inserts, the peripheral portion of the "insert", or top assembly, on which the gasket is seated is intentionally formed with a lesser diameter than that of the coffee pot opening creating an annulus therebetween. The dimensions and flexibility of the gasket are, of course, chosen to accommodate any variation in annulus dimensions deriving from maximum ±tolerance variations in both the pot and insert to be expected in production. Since the thickness and flexibility of the gasket must be such as to accommodate the largest annulus (minimum insert/maximum pot opening tolerance) to prevent leakage when coffee is dispensed, the opposite set of tolerances (maximum insert-/minimum pot opening) necessitates a "squeezing" of the gasket to seal within the thinner annulus. This produces two negative effects:

1) A significant manual effort to seat and remove the top assembly, the latter sometimes being accompanied by coffee spillage from the liquid trap as the top assembly first resists removal and then suddenly pulls free as the manual effort is increased; and 2) The "squeezed" gasket, under the influence of high temperature (upwards of 212° F.) and radial compression, tends to take a "set" corresponding to the smaller annulus dimension whereupon subsequent use of the "squeezed" gasket with a different pot and insert defining a larger annulus results in leakage of the coffee during pouring.

In an insert designed specifically for a food service bowl characterized by a relatively small pour opening and upstanding, flaring pour lip it was thought to be feasible to form an insert having a geometrically similar pour lip, to overlap the bowl lip, and a peripheral portion thereof sized to interfit, itself, with the pour opening thus eliminating the gasket. The theory being that the lesser tolerance variation (due to the smaller interfitting components) would only vary between a "snug" and "tight" fit between the peripheral portion of the insert and the bowl opening. This arrangement is shown in parent application Ser. No. 896,712 wherein deformable legs, integral with the insert, provide a seating bias. Long term usage showed that this arrangement, too, is adversely affected by the high temperature environment. Thus when an over tolerance insert is "tightly" interfitted with an under tolerance bowl opening the peripheral portion of the insert takes a set conforming to the bowl opening whereupon subsequent usage of the same insert with a bowl having an over tolerance opening results in less than a snug fit. Similarly, the integral biasing legs take a set corresponding to a smaller bowl opening and fail to provide a good seating bias, when used with a larger mouth bowl, to maintain the overlapped pour lips fully seated.

A further improvement herein disclosed concerns an accelerated coffee pour rate and simplified mold tooling as compared with previous food service bowl inserts such as disclosed in parent application Ser. No. 896,712. In commercial food establishments where food service bowls of the type herein disclosed are employed in a high volume use environment; it is important from the standpoint of employee acceptance that the coffee pour rate, through a liquid trap, not be significantly less than the normal pour rate without a liquid trap. The manner in which a simple reorientation of parts comprising the liquid trap of the present invention results in both simplified mold tooling and an increased flow rate may be seen by comparison with the parent application drawings. Essentially, the liquid trap in both cases consists of three tubular portions forming a part of a coffee pot top assembly; an inner tubular portion open at both the upper and lower ends, surrounded by a larger intermediate tubular portion having a closed upper end and an open lower end which, itself, is surrounded by a larger outer tubular portion whose lower end, external of the intermediate tubular portion, is closed while its upper end is open. The open, lower end of the intermediate tubular portion is supported above the closed lower end of the outer tubular portion but below the open, upper end of the inner tubular portion to define the liquid trap. As freshly brewed coffee flows onto the top assembly from a coffee maker the space between the inner and outer tubular portions fills to submerge the open lower end of the intermediate tubular portion, creating a liquid trap between atmosphere and the interior of the coffee pot, and thereafter overflows the open, upper end of the inner tubular portion to drain through the open, lower end thereof into the coffee pot. When the pot is tilted to dispense coffee, the coffee flows from the pot through the open ended inner tubular portion and fills the closed end of the intermediate tubular portion (the normally upper end of the tubular portion being reversed, of course, when the pot is tilted to pour) and then overflows the open end thereof to enter the outer tubular portion from which it flows to a coffee cup or the like. That volume of coffee filling the closed end of the intermediate tubular portion while pouring functions, in effect, as a reservoir to refill the liquid trap once the coffee pot has again been righted, after pouring. In other words, the volume of coffee that is trapped in the closed end of the intermediate tubular portion is sufficient, when the pot is righted, to resubmerge the open end thereof so that the liquid trap is maintained after each cup of coffee is dispensed.

Coffee pour rate is, primarily, a function of the vertical distance the open, lower (as considered when the coffee pot is upright) end of the intermediate tubular portion is spaced above the closed bottom of the outer tubular portion and the radial distance between the intermediate and outer tubular portions. Obviously, the greater these distances the greater must be the reservoir volume of the closed upper end of the intermediate tubular portion to insure subsequent submergence of the open end thereof after dispensing. It is desirable, inter alia, from the standpoint of aesthetics to keep the dimensions of the reservoir as small as possible consistent with reestablishment of the liquid trap. The insert disclosed in the parent application employed a concentric orientation of tubular parts. In order to decrease the volume required to reestablish a liquid trap, and thus keep the reservoir dimensions relatively small, a "barrier" was molded between the intermediate and outer tubular portions on the non-pouring side of the insert.

In the instant application, the tooling required to mold the barrier is eliminated since the function of the barrier is replaced by a reorientation of the tubular portions which, also, increases pour rate. This is achieved by an eccentric, rather than concentric, orientation of the inner and intermediate tubular portions relative to the outer tubular portion thus increasing volume flow capacity on the pour side of the top assembly.

SUMMARY OF THE INVENTION

A top assembly, having a pour lip geometrically similar to the pour lip of a coffee pot with which it is to be assembled, is substantially sealed with respect to the open mouth thereof through the intermediary of a resilient retainer ring loosely carried in a groove formed in a peripheral portion of the top assembly which peripheral portion is just undersize with respect to the coffee pot opening with which it interfits. The contracted diameter of the retainer ring is less than that of the smallest diameter of the coffee pot opening so that the contracted ring can pass therethrough. The unstressed ring diameter exceeds the smallest diameter of the coffee pot opening and is so sized and positioned on the top assembly as to expand into engagement with an interior wall of the coffee pot adjacent the mouth opening, after passing therethrough, to bias the top assembly pour lip into seating engagement with the coffee pot pour lip.

Of the three tubular portions, comprising a liquid trap, the innermost two are positioned eccentrically of the top assembly with the maximum radial spacing therebetween being on the pour side of the top assembly.

DESCRIPTION OF THE PREFERRED EMBODIMENT

Figure 1:
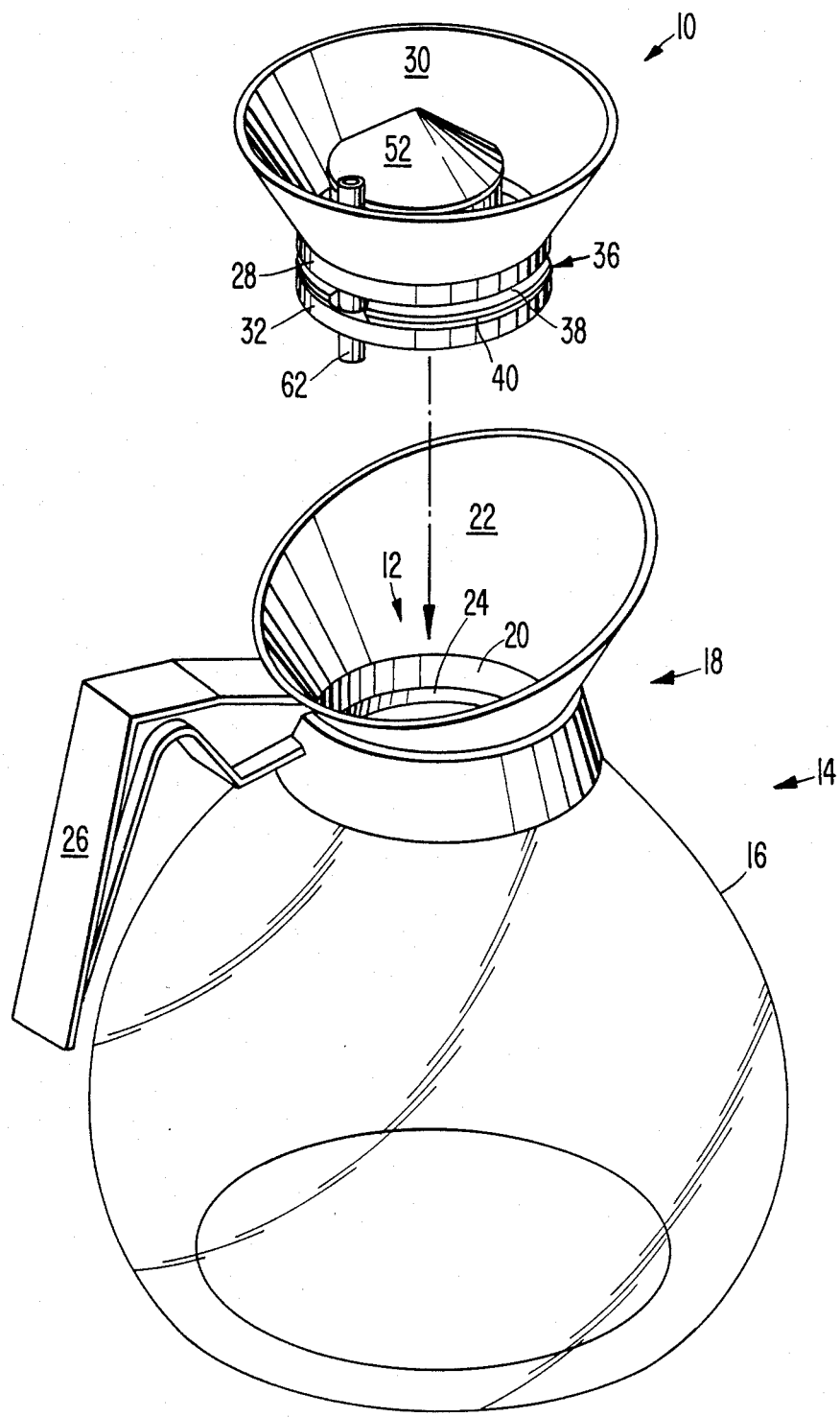
FIG. 1 is a perspective view of the top assembly of the present invention and the food service bowl with which it interfits.
Figure 2:
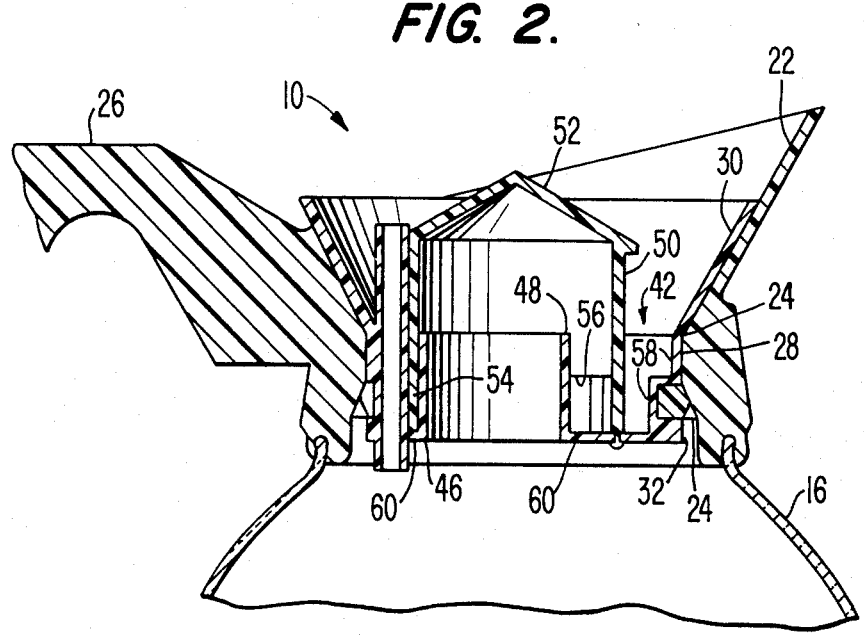
FIG. 2 is a medial section of the top assembly interfitted with a fragmentarily illustrated food service bowl.

Top assembly 10, incorporating a liquid trap, is adapted to be manually interfitted with the open mouth 12 of coffee pot 14, as diagrammatically indicated in FIG. 1, to substantially seal the same as illustrated in FIG. 2.

Coffee pot 14 is the type commonly referred to as a food service bowl consisting of a glass bowl 16 surmounted by an integrally joined, plastic lip band assembly 18 having a cylindrical neck portion 20 continuous upwardly thereof with a conically flared shoulder or pour lip 22 and continuous downwardly thereof with a conically flared shoulder 24 all joined with an integrally molded handle 26.

Top assembly 10 includes a cylindrical neck portion 28, sized to interfit with neck portion 20, continuous upwardly with a conically flared shoulder or pour lip 30, geometrically similar to pour lip 22, and continuous downwardly thereof with cylindrical extension 32 formed with a circumferential groove 34 positioned to oppose flared shoulder 24 in the fully seated position of the parts with pour lip 30 seated on pour lip 22 as shown in FIG. 2. A resilient retainer ring 36 having unstressed and contracted diameters respectively greater and less than the diameter of neck portion 20 is loosely carried in groove 34 and includes upper and lower peripheral cam faces 38, 40.

Figure 3:
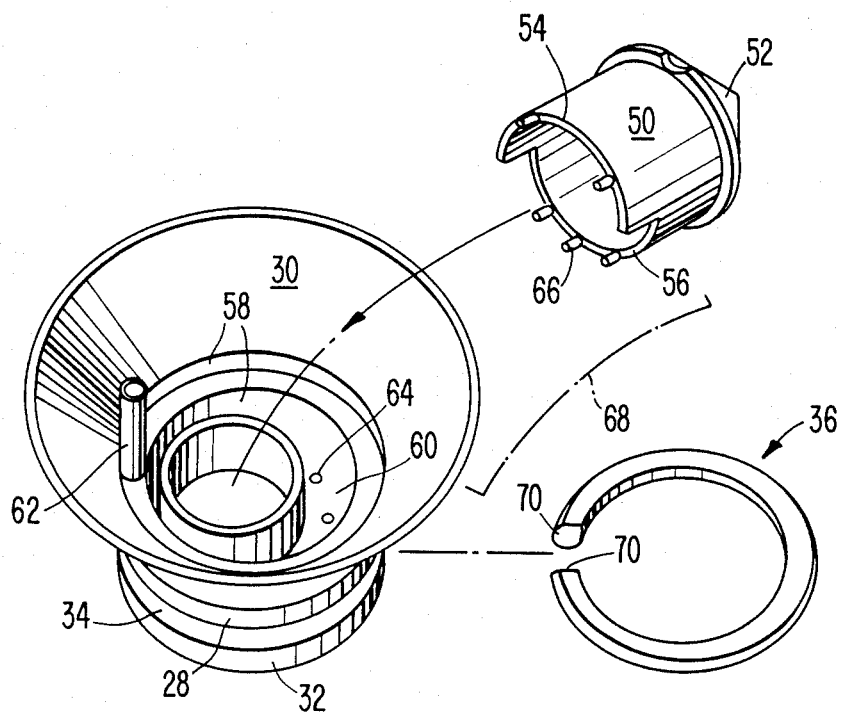
FIG. 3 is an exploded perspective of the separately molded, top assembly components.

With reference to FIGS. 2 and 3 it will be seen that liquid trap 42 is essentially formed by three tubular portions. An inner, open ended tubular portion 44 whose lower end 46 is in open communication with the interior of coffee pot 14 extends upwardly to terminate in an upper end 48 well below the uppermost extent of a larger, intermediate, surrounding tubular portion 50 whose upper end is closed by coned cover 52 and whose lower end 54 on the top assembly pour side (the side opposite handle 26) is cut away throughout approximately 180° as indicated at 56. The stepped inner wall 58 of cylindrical extension 32 comprises the outer tubular portion of liquid trap 42 which inner wall is in open, upward communication with pour lip 30 and is closed at its lower end by a bottom wall 60 as part of an integral molding supporting inner tubular portion 44 to create a "well" for submerging cutout 56 (see FIG. 3) and comprising the bottom of liquid trap 42. As will be apparent from FIG. 3, a vent tube 62 is molded integrally with inner and outer tubular portions 44, 58 to interrupt the continuity of groove 34 on the non-pouring side thereof as best seen in FIG. 1. Bottom wall 60 is molded with five openings 64 (only two of which are, shown) for the receipt of five stepped pins 66 (see FIG. 3) molded integrally with intermediate tubular portion 50 the ends of which pins are heat staked (FIG. 2) to secure the parts assemblage which, without retainer ring 36, is commonly known as an "insert" 68.

It is to be particularly noted that the radial clearance between inner tubular portion 44 and the lower part of outer tubular portion 58, on the vent tube side, approximates the wall thickness of intermediate tubular portion 50 so that, when assembled, the inner tubular portion is eccentric with respect to the intermediate tubular portion and both are eccentric to the outer tubular portion. Thus the wall thicknesses of tubular portions 44 and 58, themselves, define a barrier on the non-pouring side of the insert (to reduce the liquid trap volume required to maintain submergence of the lower cut-out portion 56 of the intermediate tubular portion) and maximal radial separation on the pour side thereof to avoid throttling coffee pour rate as is characteristic of a concentric arrangement of the parts.

The two molded parts comprising insert 68 are polypropylene while retainer ring 36 is molded Delrin.

The separation between ends 70 of unstressed retainer ring 36 exceeds the diameter of vent tube 62 by an amount sufficient to permit contraction of ring 36 to within the cylindrical profile of extension 32 so that the same may pass through neck opening 24 when ring 36 is carried in groove 34 with the ends 70 thereof straddling vent tube 62 as illustrated in FIG. 1.

The three parts comprising top assembly 10 may be assembled as indicated in FIG. 3 however ring 36 is more readily snapped into groove 34 by an axial approach to the insert rather than the radial approach indicated.

The assembled top assembly 10 is axially inserted into the open mouth of coffee pot 14 as schematically indicated in FIG. 1 whereupon retainer ring 36 is cammed into a contracted position within groove 34 by the coaction of lower cam face 40 and the lower end of conical lip 22 and further manual insertion brings neck portions 28 and 24 into juxtaposition and ring 36 expands into camming engagement with flared shoulder 24; the camming bias between upper cam face 38 of the still stressed ring 36 and flared shoulder 24 providing a constant bias to keep top assembly pour lip 30 firmly seated on pour lip 22 of the lip band assembly.

As freshly brewed coffee is introduced to coffee pot 14 it flows onto conical cover 52, thence onto bottom wall 60 to then submerge lower cut-out end 56, forming the liquid trap, thereafter overflowing upper end 48 of inner tubular portion 44 to enter the coffee pot.

When coffee is dispensed, the closed end of tubular portion 50 is, of course, filled with coffee when the pot is tilted to pour and it is this "reservoir" of coffee that drains back to resubmerge lower cut-out portion 56, when the coffee pot is righted after pouring, to reestablish the liquid trap.

The interior of the coffee pot is thus effectively sealed with respect to atmosphere, substantially eliminating oxidation and evaporation, from the time freshly brewed coffee is introduced to the pot until the last cup is dispensed.

It will be understood that when coffee pot 14 is upright with a liquid seal in place the only opening between the interior of th pot and atmosphere is the small vent opening 62. The pot is otherwise sealed.

The small diameter of vent opening 62 (typically 3/16") is such as to preclude the establishment of a gaseous recirculation therethrough. Since the vapor pressure of hot coffee within the pot exceeds atmospheric pressure, atmospheric entry through the vent is precluded except when coffee is being dispensed at which time a one cup volume of air is indrawn. The oxidative effect of such indrawn air (a maximum ten cup volume until the pot is emptied) is negligible as compared with that oxidation effected by the very large volume of constantly recirculating fresh air flow into an unsealed pot. Similarly, evaporation is virtually eliminated since any gaseous escape through the vent would tend to establish a vacuum within the pot.

I claim:

1. In combination, an open mouth coffee pot and a top assembly for said coffee pot;
   said coffee pot having a restricted coffee pot neck portion, an outwardly flaring coffee pot pour lip extendingly upwardly from said neck portion, and an outwardly flaring shoulder extending downwardly from said neck portion;
   said top assembly, including a liquid trap, interfitted with said open mouth, said top assembly having a top assembly neck portion closely interfitting, and surrounded by, said coffee pot neck portion,
   an outwardly flaring top assembly pour lip extending upwardly from said top assembly neck portion and overlying and engaging the coffee pot pour lip, and an extension member extending downwardly from said top assembly neck portion, said extension member having a circumferential groove immediately below said top assembly neck portion;
   a retainer ring seated in said circumferential groove formed in said top assembly, said retainer ring having a contracted diameter less than the diameter of said coffee pot neck portion whereby the contracted retainer ring can pass through said restricted neck portion, said retainer ring having an uncontracted diameter greater than the diameter of said neck portion, said uncontracted retainer ring engaging said outwardly flaring shoulder on said coffee pot thereby biasing said top assembly pour lip into seating engagement with said coffee pot pour lip.

2. The combination of claim 1 wherein said retainer ring has upper and lower peripheral cam faces, said lower cam face contacting said coffee pot pour lip to contract said retainer ring within said circumferential groove upon insertion of said top assembly into said open mouth of said coffee pot until said coffee pot neck portion is adjacent said top assembly neck portion wherein said upper cam face engages said outwardly flaring shoulder of said coffee pot to thereby bias said top assembly pour lip into seating engagement with said coffee pot pour lip.

3. A top assembly, including a liquid trap, adapted to be interfitted with a coffee pot of the type having a relatively restricted, coffee pot neck portion continuous upwardly and downwardly thereof with outwardly flaring shoulders; said top assembly including a top assembly neck portion sized to closely interfit with the coffee pot neck portion of the aforesaid type coffee pot; said top assembly neck portion being continuous upwardly thereof with an outwardly flaring shoulder and downwardly thereof with an extension having a circumferential groove immediately below said top assembly neck portion; and a retainer ring carried in said groove, said retainer ring having an uncontracted diameter greater than the profile of said coffee pot neck portion and a contracted diameter less than the said profile whereby said ring may be contracted to pass through the restricted neck of a coffee pot and expand into biasing engagement with a downwardly flaring shoulder thereof.

4. The top assembly of claim 3 including a vertically disposed vent tube intersecting said groove on one, non-pouring, side thereof; the free ends of said retainer ring straddling said vent tube; and the space between said free ends exceeding the diameter of said vent tube by an amount sufficient to permit the contraction of said retainer ring within said profile.

5. The top assembly of claim 4 wherein said liquid trap includes an inner, open ended tubular portion extending upwardly through an otherwise imperforate bottom wall to terminate in spaced relation below the closed, upper end of a surrounding, intermediate tubular portion and above an open lower end portion thereof; an outer tubular portion surrounding said intermediate tubular portion and defining, with said bottom wall and inner tubular portion, a well into which said open lower end portion of said intermediate tubular portion extends for submergence of the same, to form a liquid trap, when said well is filled with coffee; said inner and intermediate tubular portions being eccentrically located with respect to said outer tubular portion; and the maximal radial clearances therebetween being on the pour side of said top assembly.

* * * * *